(12) United States Patent
Hagerskans

(10) Patent No.: US 12,286,048 B2
(45) Date of Patent: Apr. 29, 2025

(54) METHOD FOR CONTROLLING A LIFTING AND LOWERING SEQUENCE OF A VEHICLE AND A VEHICLE COMPRISING A CHASSIS STRUCTURE AND A LOAD CARRYING BODY

(71) Applicant: VOLVO TRUCK CORPORATION, Gothenburg (SE)

(72) Inventor: Jonas Hagerskans, Landvetter (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 815 days.

(21) Appl. No.: 17/594,338

(22) PCT Filed: Apr. 12, 2019

(86) PCT No.: PCT/EP2019/059502
§ 371 (c)(1),
(2) Date: Oct. 12, 2021

(87) PCT Pub. No.: WO2020/207599
PCT Pub. Date: Oct. 15, 2020

(65) Prior Publication Data
US 2022/0185162 A1    Jun. 16, 2022

(51) Int. Cl.
| | | |
|---|---|---|
| *B60P 1/00* | (2006.01) | |
| *B60P 1/04* | (2006.01) | |
| *B60P 1/267* | (2006.01) | |

(52) U.S. Cl.
CPC ............... *B60P 1/045* (2013.01); *B60P 1/267* (2013.01)

(58) Field of Classification Search
CPC .................................. B60P 1/045; B60P 1/267
See application file for complete search history.

(56) References Cited

U.S. PATENT DOCUMENTS

| 6,026,341 A | 2/2000 | Harrod |
|---|---|---|
| 2014/0336883 A1 | 11/2014 | Thompson et al. |

(Continued)

FOREIGN PATENT DOCUMENTS

| AU | 2009100034 A4 | 2/2009 |
|---|---|---|
| CN | 1167056 A | 12/1997 |

(Continued)

OTHER PUBLICATIONS

Chinese Office Action dated Nov. 21, 2023 in corresponding Chinese Patent Application No. 201980095313.0, 6 pages.
(Continued)

*Primary Examiner* — Steven O Douglas
(74) *Attorney, Agent, or Firm* — Venable LLP; Jeffri A. Kaminski

(57) ABSTRACT

The present disclosure relates to a method for controlling a lifting and lowering sequence of a load carrying body (20) of a vehicle (1) and to a vehicle comprising a chassis structure (10) and the load carrying body (20) pivotally mounted on the chassis structure (10) with respect to a pivot axis being substantially parallel to either a pitch axis (Y) or a roll axis (X) of the vehicle, wherein the vehicle (1) comprises sensing means (11) provided on the chassis structure for measuring roll angle and pitch angle of the chassis structure and sensing means (21) provided on the load carrying body for measuring roll angle and pitch angle of the load carrying body. The method comprises the steps of: —(S1) measuring roll angle and pitch angle of the chassis structure and of the load carrying body during the lifting and lowering sequence, by means of the sensing means, —(S2) determining absolute roll angle and pitch angle of the chassis structure and the load carrying body, respectively, with respect to a reference, —(S3) determining a relative roll angle between the chassis structure and the load carrying body by comparing the measured roll angles of the chassis structure and the load carrying body when the load carrying body is pivotally mounted with respect to the pivot axis being substantially parallel to the pitch axis, or determining a relative pitch angle between the chassis structure and the load carrying body by comparing the measured pitch angles of the chassis structure and the load carrying body when the load carrying body is pivotally (Continued)

mounted with respect to the pivot axis being substantially parallel to the roll axis, —(S4) controlling the lifting and lowering sequence at least based on the determined absolute and relative angles.

16 Claims, 5 Drawing Sheets

(56) References Cited

U.S. PATENT DOCUMENTS

2016/0236606 A1   8/2016  Schwartz et al.
2018/0229639 A1   8/2018  Yabe

FOREIGN PATENT DOCUMENTS

| CN | 108349554 A | 7/2018 |
| GB | 1473926 A | 5/1977 |
| GB | 2484730 A | 4/2012 |
| WO | 8702128 A1 | 4/1987 |

OTHER PUBLICATIONS

International Search Report and Written Opinion dated Jan. 3, 2020 in corresponding International PCT Application No. PCT/EP2019/059502, 10 pages.
International Preliminary Report on Patentability dated Jun. 11, 2021 in corresponding International PCT Application No. PCT/EP2019/059502, 13 pages.

METHOD FOR CONTROLLING A LIFTING AND LOWERING SEQUENCE OF A VEHICLE AND A VEHICLE COMPRISING A CHASSIS STRUCTURE AND A LOAD CARRYING BODY

CROSS-REFERENCE TO RELATED APPLICATIONS

This application is a U.S. National Stage application of PCT/EP2019/059502, filed Apr. 12, 2019, and published on Oct. 15, 2020, as WO 2020/207599 A1, all of which is hereby incorporated by reference in its entirety.

TECHNICAL FIELD

The invention relates to a method for controlling a lifting and lowering sequence of a load carrying body of a vehicle comprising a chassis structure and the load carrying body pivotally mounted on the chassis structure. The invention further relates to control unit for controlling a lifting and lowering sequence of a vehicle, to a vehicle comprising the control unit, to a computer program and to a computer readable medium carrying a computer program.

The invention can be applied in heavy-duty vehicles, such as trucks, buses and construction equipment. Although the invention mainly will be described with respect to a tipper truck, the invention is not restricted to this particular vehicle, but may also be used in other vehicles, such as trailers comprising load carrying bodies and construction equipment vehicles comprising load carrying bodies.

BACKGROUND

Tipper trucks, also known as e.g. dump trucks, are usually used for transporting loose material, such as sand, gravel and demolition waste. These trucks generally comprise a chassis structure and a load carrying body in the form of a tipper body pivotally mounted on the chassis structure. The tipper body is adapted for carrying a load, such as the above mentioned sand, gravel and demolition material.

A general trend for most types of vehicles is to move in a direction where more advanced driving assistance systems are implemented, such as systems supporting the driver to stay on the road, adaptive cruise control systems etc. Vehicles are also likely to become more autonomous, allowing the vehicle to move and perform certain tasks at least for limited periods of time, without any direct human involvement. These trends are not only seen for smaller vehicles, but also for commercial vehicles including e.g. tipper trucks.

A tipper truck may be equipped with certain types of sensors for supporting the driver during a tipping sequence. For example, US 2014/0336883 A1 discloses an articulated work machine comprising a first frame connected by a coupling to a second frame comprising a chassis and a body. The relative orientation of the first frame and the body can be determined by using output from inertia sensors mounted on the first frame and the body. The articulated work machine further includes a controller configured to compare the outputs of the sensors to calculate the position of the body and the frame relative to each other. The angle information may be used to support the driver by setting safety limits for the various angles.

For autonomous or semi-autonomous vehicles, there is however normally no driver present who can monitor e.g. a tipping sequence. Therefore, there is a strive towards developing more advanced control systems for autonomous or semi-autonomous vehicles having load carrying bodies, such as tipper bodies.

SUMMARY

An object of the invention is to provide an improved method, which provides a safe and efficient lifting and lowering sequence of a load carrying body of a vehicle. Another object is to provide an improved vehicle which can automatically perform a lifting and lowering sequence of a pivotally mounted load carrying body in a safe and efficient manner.

According to a first aspect, the object is achieved by a method. According to a second aspect, the object is achieved by a control unit. According to a third aspect, the object is achieved by a vehicle. According to a fourth aspect, the object is achieved by a computer program. According to a fifth aspect, the object is achieved by a computer readable medium carrying a computer program comprising program code means.

According to the first aspect thereof, the object is achieved by a method for controlling a lifting and lowering sequence of a load carrying body of a vehicle comprising a chassis structure and the load carrying body pivotally mounted on the chassis structure with respect to a pivot axis being substantially parallel to either a pitch axis or a roll axis of the vehicle, wherein the vehicle comprises sensing means provided on the chassis structure for measuring roll angle and pitch angle of the chassis structure and sensing means provided on the load carrying body for measuring roll angle and pitch angle of the load carrying body. The method comprises:

- measuring roll angle and pitch angle of the chassis structure and of the load carrying body during the lifting and lowering sequence, by means of the sensing means,
- determining absolute roll angle and pitch angle of the chassis structure and the load carrying body, respectively, with respect to a reference,
- determining a relative roll angle between the chassis structure and the load carrying body by comparing the measured roll angles of the chassis structure and the load carrying body when the load carrying body is pivotally mounted with respect to the pivot axis being substantially parallel to the pitch axis, or determining a relative pitch angle between the chassis structure and the load carrying body by comparing the measured pitch angles of the chassis structure and the load carrying body when the load carrying body is pivotally mounted with respect to the pivot axis being substantially parallel to the roll axis, and
- controlling the lifting and lowering sequence at least based on the determined absolute and relative angles.

A "roll angle" and a "pitch angle" as used herein are expressions which are well known by the skilled person. For example, a roll angle may be defined as a rotation angle around a first axis of the vehicle extending in the longitudinal direction thereof, i.e. a roll axis, and a pitch angle may be defined as a rotation angle around a second axis of the vehicle being perpendicular to and intersecting the first axis, and extending in the transverse direction of the vehicle, i.e. a pitch axis.

The expression "lifting and lowering sequence" as used herein for a load carrying body means an operation whereby the load carrying body is at least pivotally moved with respect to the chassis structure for carrying out a mission, such as tipping a load and/or releasing the load carrying body from the chassis structure. Hence, the lifting and lowering sequence is performed when the load carrying body is pivoted with respect to the chassis structure by the pivotal mounting between the chassis structure and the load carrying body. According to one preferred embodiment, the lifting and lowering sequence is a tipping sequence, whereby the load carrying body is a tipper body.

The expression "load carrying body" as used herein means a body which is adapted for carrying a load, and which is a receptacle and/or container for the load. According to a preferred embodiment, the load carrying body is a tipper body.

Optionally, the reference used for determining absolute roll and pitch angles may be a reference axis and/or a reference plane, for example based on the earth's gravity, whereby the absolute roll and pitch angle for example may be measured with respect to an artificial horizon.

By virtue of the method as disclosed herein, a safer and more efficient lifting and lowering sequence of the load carrying body is provided. More particularly, by having sensing means which measure roll and pitch angles on both the chassis structure and on the load carrying body, the lifting and lowering sequence can be more efficiently controlled since it will provide more relevant angle information. In fact, the inventor has realized that not only the absolute roll and pitch angles are important for controlling the lifting and lowering sequence, but also the relative roll angle or pitch angle between the chassis structure and the load carrying body, depending on how the load carrying body is pivotally mounted on the chassis structure, i.e. either substantially parallel to the pitch axis or substantially parallel to the roll axis of the vehicle. This has shown to be especially important in the case when the lifting and lowering sequence is conducted autonomously, i.e. without any direct human involvement or when there is no driver present who can monitor the lifting and lowering sequence, such as in an autonomous vehicle. The relative roll angle or pitch angle information may be used for efficiently detecting fatal errors during the lifting and lowering sequence. For example, a lifting arm, e.g. a hydraulic cylinder, may be damaged or broken during the sequence, and this may be identified by observing the relative roll angle or pitch angle during the lifting and lowering sequence, depending on how the load carrying body is pivotally mounted on the chassis structure.

Optionally, the lifting and lowering sequence may be controlled by a control loop, wherein the measured roll and pitch angles are provided as input, and wherein at least a first request for lifting the load carrying body and preferably a second subsequent request for lowering the load carrying body is/are provided as output. In fact, it has been realized that the method is especially suitable for automatic control of the lifting and lowering sequence, without any direct human involvement. Thereby, by implementing the lifting and lowering sequence into a control loop as in the above, the lifting and lowering sequence may be performed efficiently without compromising with safety.

Optionally, the method may further comprise a step of emergency lowering the load carrying body if the relative roll angle is equal to or exceeds a first predetermined relative roll angle threshold value when the load carrying body is pivotally mounted with respect to the pivot axis being substantially parallel to the pitch axis, or emergency lowering the load carrying body if the relative pitch angle is equal to or exceeds a first predetermined relative pitch angle threshold value when the load carrying body is pivotally mounted with respect to the pivot axis being substantially parallel to the roll axis. Hence, if it is detected during the lifting and lowering sequence that the relative roll angle is equal to or exceeding the first predetermined relative roll angle threshold value when the load carrying body is pivotally mounted with respect to the pivot axis being substantially parallel to the pitch axis, the load carrying body will be lowered, preferably lowered to an initial position, thereby reducing the risk of a fatal error. Further, if it is detected during the lifting and lowering sequence that the relative pitch angle is equal to or exceeding the first predetermined relative pitch angle threshold value when the load carrying body is pivotally mounted with respect to the pivot axis being substantially parallel to the roll axis, the load carrying body will be lowered, preferably lowered to an initial position, thereby reducing the risk of a fatal error. For example, such error may be caused by a failing hydraulic cylinder used for lifting the load carrying body. Still optionally, in the event the lifting and lowering sequence is performed autonomously, the method may further comprise a step of submitting an error signal to a remote central for informing about the error relating to that the relative roll angle or relative pitch angle has equalled or exceeded the threshold value. Thereby, the remote central may be informed about the incident and thereby take necessary actions, such as requesting the vehicle to drive to a certain position, such as a service center.

Optionally, the method may further comprise a step of emergency lowering the load carrying body and/or preventing lifting of the load carrying body if the absolute roll angle of the chassis structure or of the load carrying body is equal to or exceeds a first predetermined absolute roll angle threshold value. For example, the absolute roll angle of the load carrying body and/or the chassis structure may not exceed a certain angle to reduce the risk of the vehicle rolling over. Thereby, by monitoring that the absolute chassis structure and/or load carrying body roll angle(s) is/are not equal to or exceeding a threshold value, roll over protection may be provided.

Optionally, the method may further comprise a step of emergency lowering the load carrying body and/or preventing lifting of the load carrying body if the absolute pitch angle of the chassis structure is equal to or exceeds a first predetermined absolute pitch angle threshold value. For similar reasons as in the above, monitoring absolute pitch angle of the chassis structure may prevent the vehicle from tipping over if the vehicle is e.g. located on an inclined ground surface before and/or during the lifting and lowering sequence. Still optionally, the method may further comprise a step of emergency lowering the load carrying body if the absolute pitch angle of the load carrying body is equal to or exceeds a second predetermined absolute pitch angle threshold value.

Optionally, the method may further comprise a step of determining a relative pitch angle between the chassis structure and the load carrying body by comparing the measured pitch angles of the chassis structure and the load carrying body when the load carrying body is pivotally mounted with respect to the pivot axis being substantially parallel to the pitch axis, or determining a relative roll angle between the chassis structure and the load carrying body by comparing the measured roll angles of the chassis structure and the load carrying body when the load carrying body is pivotally mounted with respect to the pivot axis being substantially parallel to the roll axis. Thereby, during the lifting and lowering sequence, a current lifting and lowering angle may be provided, preferably as input into the above mentioned control loop. The current lifting and lowering angle may in an embodiment be defined as a current tipping angle with respect to the chassis structure.

Optionally, the method may further comprise a step of determining that the load carrying body is fully lifted when the relative pitch angle is equal to or above a second predetermined relative pitch angle threshold value when the load carrying body is pivotally mounted with respect to the pivot axis being substantially parallel to the pitch axis, or determining that the load carrying body is fully lifted when the relative roll angle is equal to or above a second predetermined relative roll angle threshold value when the load carrying body is pivotally mounted with respect to the pivot axis being substantially parallel to the roll axis. Alternatively, the method may further comprise a step of determining that the load carrying body is fully lifted when the relative pitch angle and the absolute pitch angle of the chassis structure is equal to or above a second predetermined relative pitch angle threshold value when the load carrying body is pivotally mounted with respect to the pivot axis being substantially parallel to the pitch axis, or a step of determining that the load carrying body is fully lifted when the relative roll angle and the absolute roll angle of the chassis structure is equal to or above a second predetermined relative roll angle threshold value when the load carrying body is pivotally mounted with respect to the pivot axis being substantially parallel to the pitch axis. Thereby, a request for lifting the load carrying body may be stopped when it is determined that the load carrying body is fully lifted. Hence, and still optionally, the method may further comprise a step of stopping a request for lifting the load carrying body when it is determined that the load carrying body is fully lifted. Stopping a request for lifting may reduce energy consumption during the lifting and lowering sequence. For example, if a hydraulic cylinder is used for lifting and lowering the load carrying body, less energy may be consumed by stopping the lifting request. This has been found to be advantageous in the case when the lifting and lowering operation is performed by the above mentioned control loop, and when no driver is present for monitoring the lifting and lowering sequence.

Optionally, the method may further comprise a step of determining that the lifting and lowering sequence is completed when the relative pitch angle is equal to or below a third predetermined relative pitch angle threshold value when the load carrying body is pivotally mounted with respect to the pivot axis being substantially parallel to the pitch axis, or determining that the lifting and lowering sequence is completed when the relative roll angle is equal to or below a third predetermined relative roll angle threshold value when the load carrying body is pivotally mounted with respect to the pivot axis being substantially parallel to the roll axis. Still optionally, the method may further comprise a step of providing a request for initiating driving of the vehicle if it is determined that the lifting and lowering sequence is completed. For example, the request may be provided to an autonomous driving control unit, which may be provided on the vehicle, which then initiates driving of the vehicle after the lifting and lowering sequence is considered completed. In this regard, it shall be noted that the vehicle does not necessarily need to be standing still during the lifting and lowering sequence, and the provided driving request may therefore be an additional driving request which rather relates to driving away from the location where the lifting and lowering sequence was performed.

Optionally, the method may further comprise a step of measuring a pitch angular velocity of the load carrying body during the lifting and lowering sequence, by means of the sensing means, and further controlling the lifting and lowering sequence based on the measured pitch angular velocity when the load carrying body is pivotally mounted with respect to the pivot axis being substantially parallel to the pitch axis, or measuring a roll angular velocity of the load carrying body during the lifting and lowering sequence, by means of the sensing means, and further controlling the lifting and lowering sequence based on the measured roll angular velocity when the load carrying body is pivotally mounted with respect to the pivot axis being substantially parallel to the roll axis. It has namely been realized that not only absolute and relative angles may be of interest to efficiently and safely control the lifting and lowering sequence. The pitch angular velocity or roll angular velocity of the load carrying body may for example be used to control the pitch or roll angular velocity during the lifting and lowering sequence by e.g. controlling the first request for lifting and/or the second request for lowering the load carrying body in the above mentioned control loop. Hence, this may be especially suitable when the lifting and lowering sequence is performed autonomously.

According to the second aspect thereof, the object is achieved by a control unit for controlling a lifting and lowering sequence of a load carrying body of a vehicle, the control unit being configured to perform the steps of the method according to any one of the embodiments of the first aspect. Advantages and effects provided by the second aspect are largely analogous to advantages and effects provided by the first aspect of the invention. It shall also be noted that all embodiments of the first aspect are compatible with all embodiments of the second aspect and vice versa.

According to the third aspect thereof, the object is achieved by a vehicle comprising a chassis structure and a load carrying body pivotally mounted on the chassis structure with respect to a pivot axis being substantially parallel to either a pitch axis or a roll axis of the vehicle, the vehicle comprising sensing means provided on the chassis structure for measuring roll and pitch angle thereof and sensing means provided on the load carrying body for measuring roll and pitch angle thereof, and a control unit according to any one of the embodiments of the second aspect of the invention. Advantages and effects provided by the third aspect are largely analogous to advantages and effects provided by the first and second aspects of the invention. It shall also be noted that all embodiments of the first and second aspects are compatible with all embodiments of the third aspect and vice versa.

Optionally, the sensing means of the chassis structure and/or of the load carrying body may be any one of an inclination sensor, an accelerometer, a gyroscope, or the like.

Optionally, the vehicle may be an autonomous vehicle. The expression "autonomous vehicle" as used herein means a vehicle which is adapted to move and perform certain tasks at least for limited periods of time, without any direct human involvement. Hence, the control of the vehicle, including longitudinal and/or lateral motion control, and control of certain tasks, such as the herein disclosed lifting and lowering sequence may be performed autonomously without the control of a driver. Rather, the lifting and lowering sequence and optionally vehicle motion control is/are performed by at least one control unit, which may be located on the vehicle or located remotely from the vehicle.

According to the fourth aspect thereof, the object is achieved by a computer program comprising program code means for performing the steps of any of the embodiments of the first aspect, when said program is run on a computer.

According to the fifth aspect thereof, the object is achieved by a computer readable medium carrying a computer program comprising program code means for performing the steps of any of the embodiments of the first aspect, when said program product is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
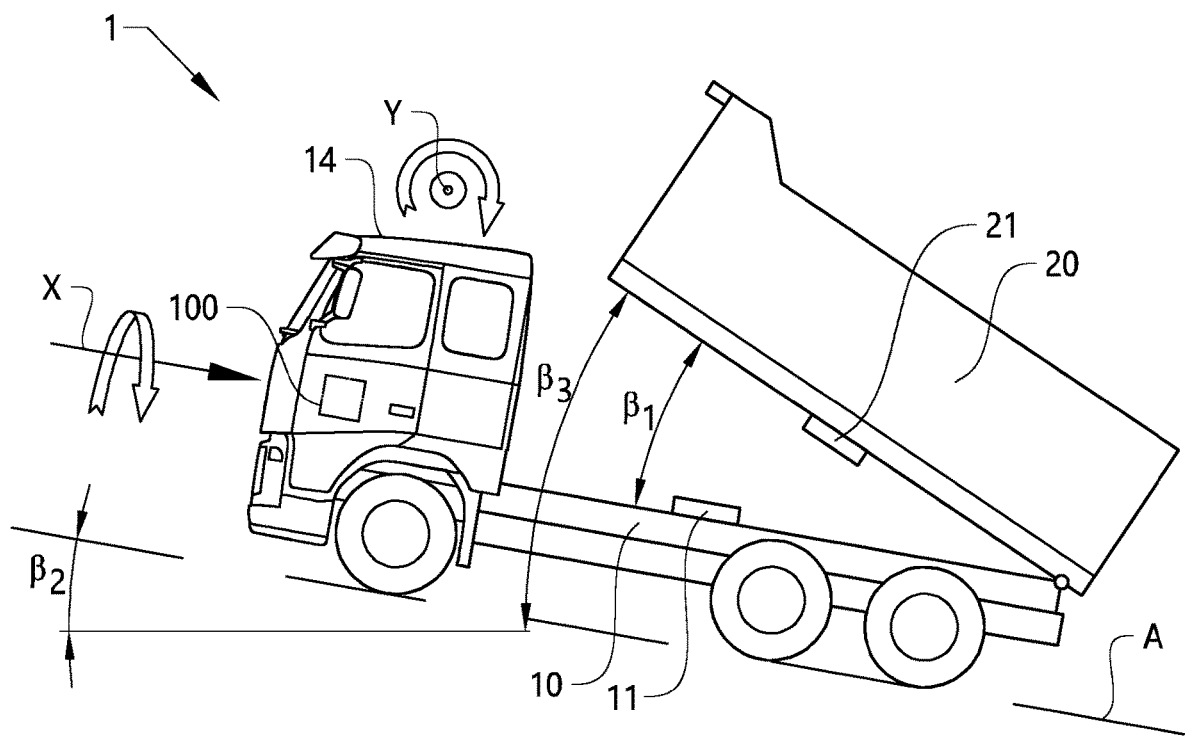
FIG. 1 is a perspective view of a vehicle according to an example embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

In FIG. 1 a perspective view of a vehicle 1 in the form of a tipper truck is shown. In fact, the vehicle 1 being in the form of a tipper truck is one preferred embodiment. A tipper truck, which also may be denoted a dump truck, is normally a heavy-duty truck which comprises a chassis structure 10 and a tipper body 20 pivotally mounted on the chassis structure 10, either with respect to a pivot axis being substantially parallel to a pitch axis Y or to a roll axis X of the vehicle. The vehicle as shown in FIG. 1 has a load carrying body 20 which is pivotally mounted on the chassis structure 10 with respect to a pivot axis which is substantially parallel to the pitch axis Y of the vehicle. The invention is however not limited to only this configuration, but is also applicable to vehicles in which the load carrying body is pivotally mounted on the chassis structure with respect to a pivot axis which is substantially parallel to the roll axis X. According to an embodiment, the load carrying body, which may be in the form of the tipper body 20, is directly pivotally mounted on the chassis structure 1, e.g. the load carrying body may be attached to the chassis structure via a pivoting connection. The present invention is however not restricted to only this type of vehicle as shown in FIG. 1, but could likewise be implemented for other vehicles, such as for trailers having pivotally mounted load carrying bodies, trucks having pivotally mounted containers, trucks having releasable and pivotally mounted load carrying bodies, work machines having pivotally mounted load carrying bodies, garbage trucks, concrete trucks etc.

Further, the below described embodiments will mainly be described as part of an autonomous vehicle, which is one preferred embodiment, although the invention is not only applicable to such vehicles, but could also be used for other vehicles, such as for semi-autonomous vehicles where the vehicle is in autonomous mode for at least limited periods of time and/or for vehicles where at least the lifting and lowering sequence is performed without any direct human involvement. The present invention may even be useful for vehicles where a human is involved in controlling at least parts of the lifting and lowering sequence of the load carrying body.

In FIG. 1 a perspective view of a vehicle 1 in the form of a tipper truck is shown. The tipper truck 1 is an autonomous vehicle where motion control, comprising longitudinal and lateral motion control, and a lifting and lowering sequence can be performed automatically, without any control by e.g. a driver. The lifting and lowering sequence is instead performed by a control unit 100 provided on the tipper truck 1, which will be further described in the below. The tipper truck 1 comprises a chassis structure 10 with a cab 14 and also a load carrying body 20, which here is a tipper body. The tipper truck 1 further comprises sensing means 11 provided on the chassis structure 10 for measuring roll angle and pitch angle thereof and sensing means 21 provided on the load carrying body for measuring roll angle and pitch angle thereof. The lifting and lowering sequence for the tipper tuck 1 is here a tipping sequence, whereby the tipper body 20 may be lifted and lowered for releasing a load, such as sand, gravel, demolition waste etc.

The sensing means 11 and 21 are adapted for measuring roll angle about a longitudinal axis X of the tipper truck 1 and pitch angle about a transverse axis Y of the tipper truck 1. The longitudinal axis X and the transverse axis Y may for example be part of a Cartesian coordinate system. The sensing means 11 and 21 are in communicative contact with the control unit 100. The communication may for example be conducted by a Controller Area Network (CAN) system of the vehicle, by wireless communication, such as by WiFi™ Bluetooth® or the like.

In FIG. 1, the tipper truck 1 is performing a tipping sequence on an inclined ground surface A, which is inclined by an angle $\beta_2$ with respect to a horizontal plane. The angle $\beta_2$ is a pitch angle, i.e. a rotation angle about the Y-axis with respect to the horizontal plane. This absolute angle is here determined by the sensing means 11 on the chassis structure, which may for example be an inclination sensor. Further, the tipper body 20 has been lifted such that there is a relative pitch angle $\beta_1$ between the chassis structure 10 and the tipper body 20. This angle may also be defined as the current tipping angle with respect to the chassis structure 10. The relative pitch angle $\beta_1$ can be determined by comparing the pitch angle $\beta_2$ of the chassis structure 10 and the pitch angle $\beta_3$ of the tipper body 20, which are measured by the sensing means 11 and 21, respectively. The angle $\beta_3$ is here an absolute angle with respect to the horizontal plane. This angle may be beneficial to determine for the tipping sequence when unloading a load from the tipper body, since the load in the tipper body is released by use of the gravitational force. As can be seen, the tipper body 20 is pivotally movable with respect to the chassis structure 10 around a pivot axis which is parallel to the Y-axis.

Figure 2:
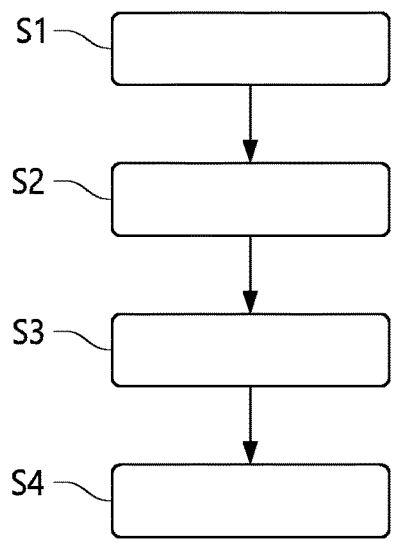
FIG. 2 is a flowchart of a method according to an example embodiment of the present invention.

In FIG. 2 a flowchart of a method is disclosed for controlling the tipping sequence of the tipper truck 1, comprising the steps of:
S1: measuring roll angle and pitch angle of the chassis structure 10 and of the tipper body during the tipping sequence, by means of the sensing means 11 and 21,
S2: determining absolute roll angle and pitch angle $\beta_2$ of the chassis structure 10 and the tipper body 20, respectively, with respect to a horizontal plane,
S3: determining a relative roll angle $\alpha_1$ between the chassis structure 10 and the tipper body 20 by comparing the measured roll angles of the chassis structure 10 and the tipper body 20, and
S4: controlling the tipping sequence at least based on the determined absolute and relative angles.

Figure 3A:
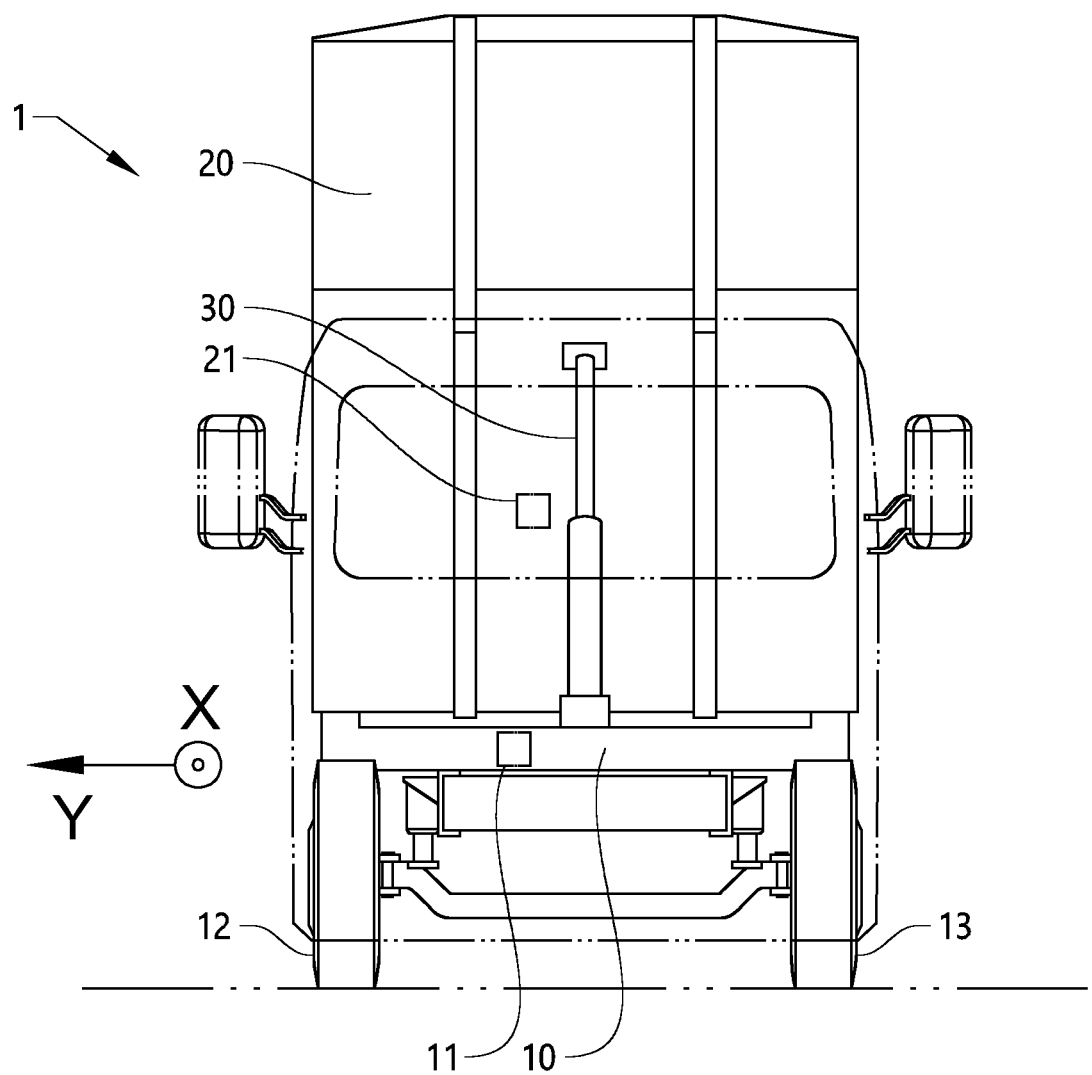
FIGS. 3a-c are schematic views of a vehicle during a lifting and lowering sequence according to an example embodiment of the present invention.
Figure 3B:
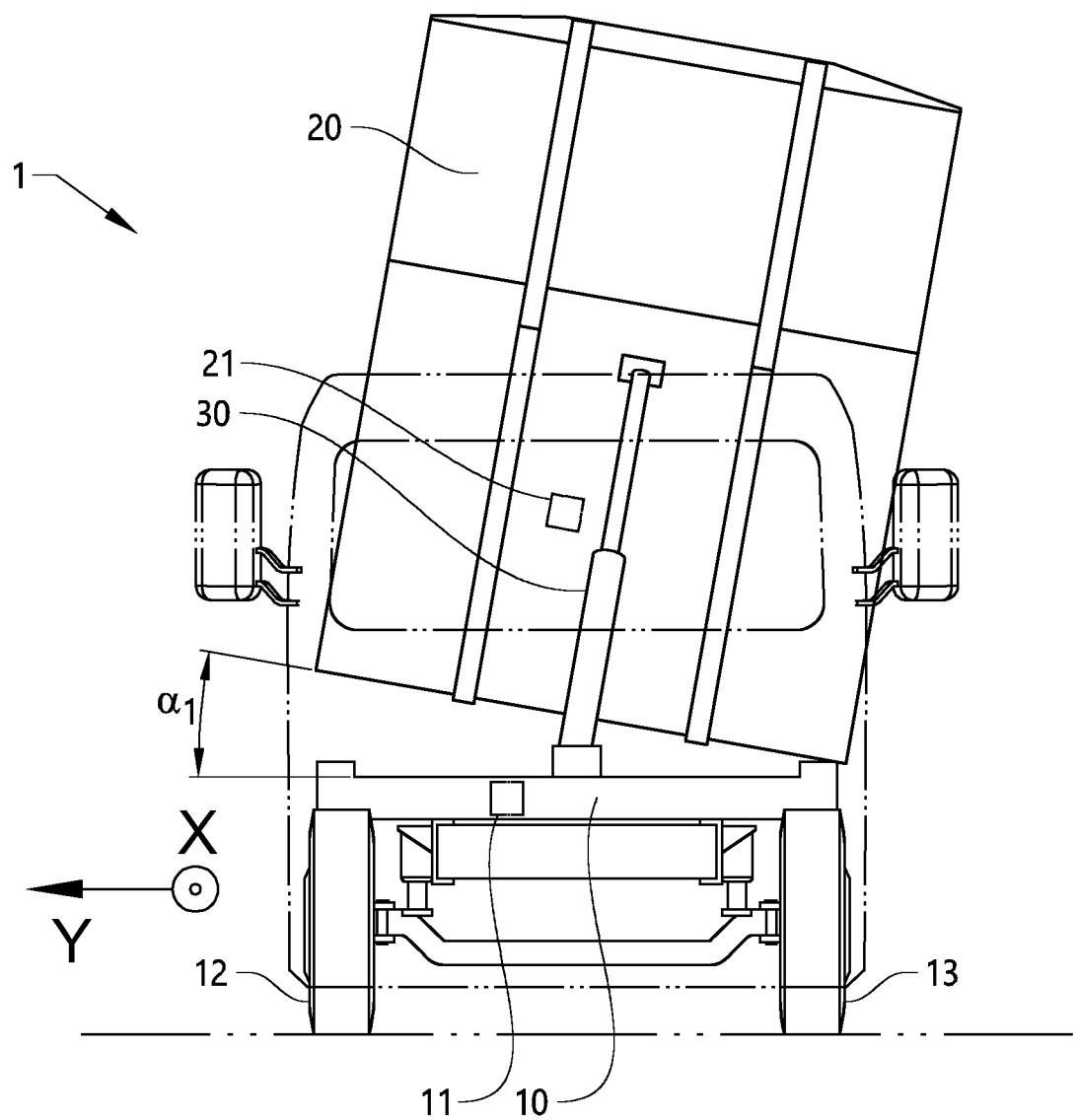
Figure 3C:
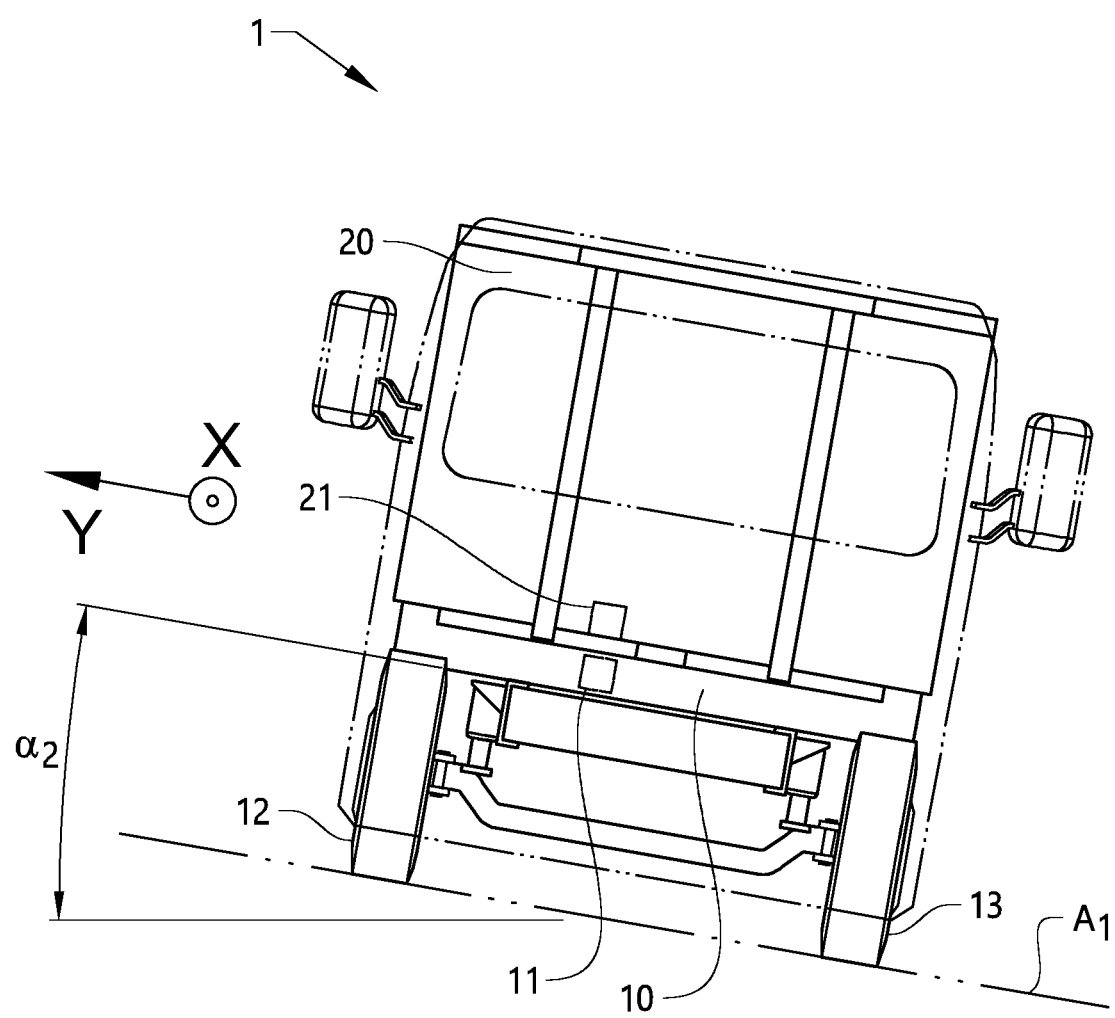

FIGS. 3a, 3b and 3c show front views of a vehicle 1 comprising a chassis structure 10 and a load carrying body 20. The cabin 14 as shown in FIG. 1 is here shown with dashed lines to better show the interaction between the chassis structure 10 and the load carrying body 20. It shall be noted that the vehicle 1 may not be equipped with a cabin 14, especially in the case when the vehicle 1 is an autonomous vehicle. The chassis structure 10 is further equipped with ground engaging means 12 and 13, here in the form of wheels, provided on the left-hand and right-hand side. The vehicle 1 further comprises sensing means 11 provided on the chassis structure 10 and sensing means 21 provided on the load carrying body 20. The load carrying body 20 can be pivotally lifted and lowered with respect the chassis structure 10 by means of an actuating member 30, which may be in the form of a hydraulic cylinder. It shall be noted that any type and any number of actuating member(s) may be used for pivotally moving the load carrying body 20 with respect to the chassis structure 10. The actuating member may also for example be in the form of an actuating arm which is adapted for providing a pivoting and translating motion of the load carrying body 20 with respect to the chassis structure 10.

In FIG. 3a, the relative roll angle of the chassis structure 10 and the load carrying body 20 about the X-axis is zero degrees. In FIG. 3b, the relative roll angle is $\alpha_1$, which here shows a situation when there is a risk of a fatal error, i.e. that the actuating member 30 is about to fail. The angle $\alpha_1$ is preferably compared with a relative roll angle threshold value, whereby the load carrying body 20 is preferably emergency lowered if the angle is equal to or exceeding the relative roll angle threshold value. Thereby, fatal errors may be avoided.

FIG. 3c shows a situation when the load carrying body 20 is in a lowered position, i.e. the relative pitch angle between the chassis structure 10 and the load carrying body 20 is zero degrees. However, the vehicle 1 is here running on a ground surface A1 which is inclined by an absolute roll angle $\alpha_2$ with respect to a horizontal plane. The absolute roll angle $\alpha_2$ is measured by the sensing means 11 provided on the chassis structure 10. However, since the relative roll angle is zero, the same angle information may also be provided by the sensing means 21 on the load carrying body. In the shown situation, the absolute roll angle $\alpha_2$ of the chassis structure is equal to or exceeds a first predetermined absolute roll angle threshold value, and thereby lifting of the load carrying body 20 is prevented by the control unit 100 (not shown in FIG. 3c).

Figure 4:
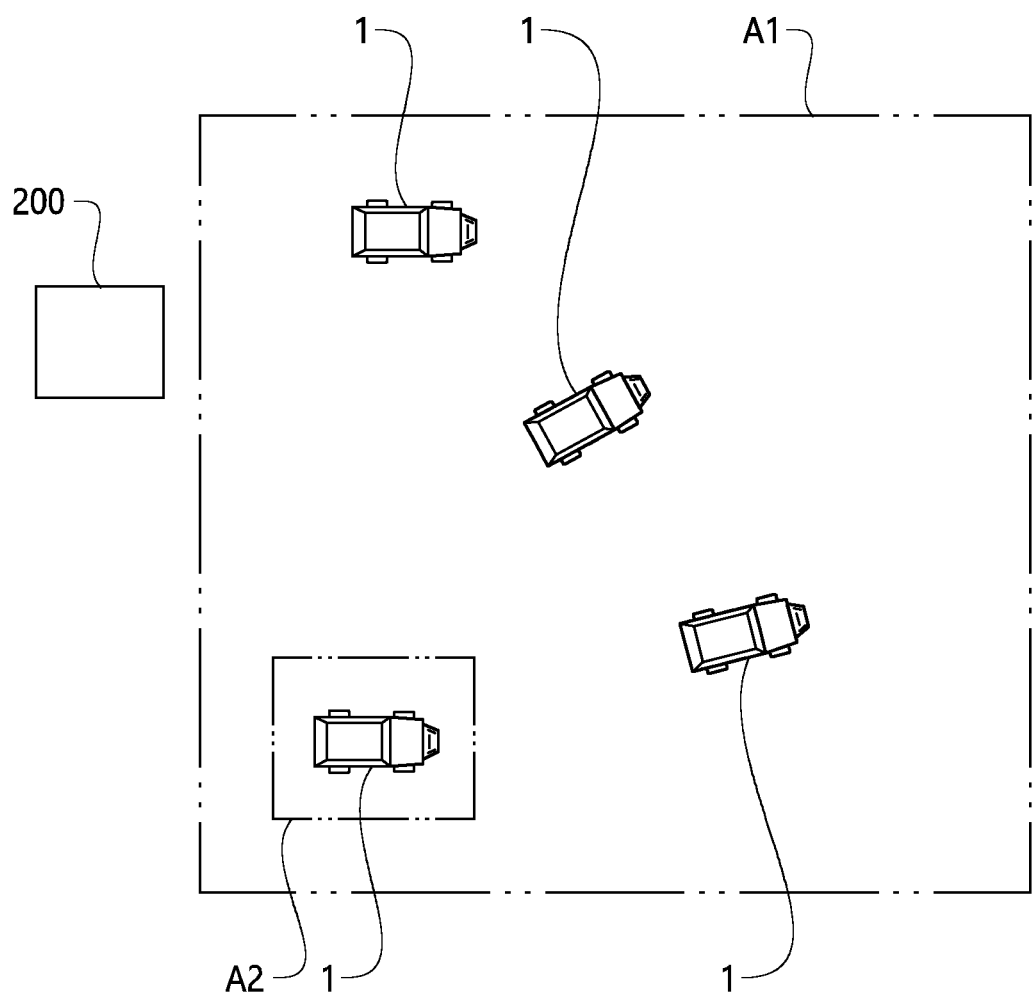
FIG. 4 is a schematic view of a confined area comprising a plurality of vehicles according to example embodiments of the present invention.

FIG. 4 shows a schematic view of a confined area A1 from above in which one or more autonomous vehicles 1 according to example embodiments of the present invention may operate. The confined area A1 may be any one of a construction area, a mining area, an earthwork area, or the like. Especially, the confined area A1 may be an area in which one or more commercial vehicles 1 are operating. The confined area A1 may be delimited by e.g. a physical fence and/or by an imaginary fence which is recognized by the autonomous vehicles 1. The vehicle 1 may be a fully autonomous vehicle which only operates autonomously, or the vehicle 1 may be adapted to switch between manual mode and autonomous mode, where in the manual mode a user (not shown) is operating the vehicle 1. The user may be operating the vehicle at a remote location, such as from a remote center 200, or may be located in the vehicle, i.e. a driver. According to an example embodiment, in the event it has been determined that the relative roll angle between the load carrying body 20 and the chassis structure 10 is equal to or has exceeded a predetermined threshold value, a request may be issued that the vehicle 1 shall return to a service station A2, which here is located in the confined area A1. Hence, the vehicle 1 may need to undergo inspection and/or service after such an event. Thereby, by monitoring the relative roll angle as in the above, fatal errors requiring inspection/service may be detected at an early stage, whereby the vehicle 1 immediately thereafter may return to the service station A2.

The remote center 200 may also receive information about if any angle, absolute and/or relative, of the chassis structure 10 and load carrying body 20 has been reached or exceeded according to set predetermined limits as indicated herein, whereby certain actions may be initiated based thereon. For example, if an angle has equalled or exceeded a predetermined value, a request for the vehicle 1 returning to the service station A2 may be issued. Moreover, the remote center 200 may receive a signal indicating that a vehicle 1 has completed a lifting and lowering sequence and that it therefore is ready for receiving a new instruction relating to a new mission. The completion of the lifting and lowering sequence may be identified in that the relative pitch angle is equal to or below a third predetermined relative pitch angle threshold value as described in the above. Still optionally, the vehicle 1 may be adapted to initiate a lifting and lowering sequence when the vehicle 1 has reached a predefined location. The identification of the location may e.g. be determined by use of a GNSS system (Global Navigation Satellite System) provided on the vehicle. Still further, the lifting and lowering sequence may be initiated upon request from the remote center 200.

The communication between the vehicles 1 and the remote center 200 may preferably be performed by wireless communication, such as by WiFi™, 3g, 4g, 5g, Bluetooth® or the like. Hence, the remote center 200 preferably comprises a computer, such as at least one processing unit and a memory unit which are adapted to wirelessly communicate, directly or indirectly, with control units 100 on the vehicles 1.

It is to be understood that the present invention is not limited to the embodiments described above and illustrated in the drawings; rather, the skilled person will recognize that many changes and modifications may be made within the scope of the appended claims.

The invention claimed is:
1. A method for controlling a lifting and lowering sequence of a load carrying body of a vehicle comprising a chassis structure and the load carrying body pivotally mounted on the chassis structure with respect to a pivot axis being substantially parallel to either a pitch axis or a roll axis of the vehicle, characterized in that the vehicle comprises sensing means provided on the chassis structure for measuring roll angle and pitch angle of the chassis structure and sensing means provided on the load carrying body for measuring roll angle and pitch angle of the load carrying body, the method comprising:

measuring roll angle and pitch angle of the chassis structure and of the load carrying body during the lifting and lowering sequence, by means of the respective sensing means, determining absolute roll angle and pitch angle of the chassis structure and the load carrying body, respectively, with respect to a reference, determining a relative roll angle between the chassis structure and the load carrying body by comparing the measured roll angles of the chassis structure and the load carrying body when the load carrying body is pivotally mounted with respect to the pivot axis being substantially parallel to the pitch axis, or determining a relative pitch angle between the chassis structure and the load carrying body by comparing the measured pitch angles of the chassis structure and the load carrying body when the load carrying body is pivotally mounted with respect to the pivot axis being substantially parallel to the roll axis, controlling the lifting and lowering sequence at least based on the determined absolute angles and the determined relative angle, wherein the method further comprises:

emergency lowering the load carrying body if the relative roll angle is equal to or exceeds a first predetermined relative roll angle threshold value when the load carrying body is pivotally mounted with respect to the pivot axis being substantially parallel to the pitch axis, or emergency lowering the load carrying body if the relative pitch angle is equal to or exceeds a first predetermined relative pitch angle threshold value when the load carrying body is pivotally mounted with respect to the pivot axis being substantially parallel to the roll axis.

2. The method according to claim 1, whereby the lifting and lowering sequence is controlled by a control loop, wherein the measured roll and pitch angles are provided as input, and wherein at least a first request for lifting the load carrying body is provided as output.

3. The method according to claim 1, further comprising a step of emergency lowering the load carrying body and/or preventing lifting of the load carrying body if the absolute roll angle of the chassis structure or of the load carrying body is equal to or exceeds a first predetermined absolute roll angle threshold value.

4. The method according to claim 1, further comprising a step of emergency lowering the load carrying body and/or preventing lifting of the load carrying body if the absolute pitch angle of the chassis structure is equal to or exceeds a first predetermined absolute pitch angle threshold value.

5. The method according claim 1, further comprising a step of emergency lowering the load carrying body if the absolute pitch angle of the load carrying body is equal to or exceeds a second predetermined absolute pitch angle threshold value.

6. The method according to claim 1, further comprising a step of determining a relative pitch angle between the chassis structure and the load carrying body by comparing the measured pitch angles of the chassis structure and the load carrying body when the load carrying body is pivotally mounted with respect to the pivot axis being substantially parallel to the pitch axis, or determining a relative roll angle between the chassis structure and the load carrying body by comparing the measured roll angles of the chassis structure and the load carrying body when the load carrying body is pivotally mounted with respect to the pivot axis being substantially parallel to the roll axis.

7. The method according to claim 6, further comprising a step of determining that the load carrying body is fully lifted when the relative pitch angle is equal to or above a second predetermined relative pitch angle threshold value when the load carrying body is pivotally mounted with respect to the pivot axis being substantially parallel to the pitch axis, or determining that the load carrying body is fully lifted when the relative roll angle is equal to or above a second predetermined relative roll angle threshold value when the load carrying body is pivotally mounted with respect to a pivot axis being substantially parallel to the roll axis.

8. The method according to claim 7, further comprising a step of stopping a request for lifting the load carrying body when it is determined that the load carrying body is fully lifted.

9. The method according to claim 6, further comprising a step of determining that the lifting and lowering sequence is completed when the relative pitch angle is equal to or below a third predetermined relative pitch angle threshold value when the load carrying body is pivotally mounted with respect to the pivot axis being substantially parallel to the pitch axis, or determining that the lifting and lowering sequence is completed when the relative roll angle is equal to or below a third predetermined relative roll angle threshold value when the load carrying body is pivotally mounted with respect to the pivot axis being substantially parallel to the roll axis.

10. The method according to claim 9, further comprising a step of providing a request for initiating driving of the vehicle if it is determined that the lifting and lowering sequence is completed.

11. The method according to claim 1, further comprising a step of measuring a pitch angular velocity of the load carrying body during the lifting and lowering sequence, by means of the sensing means provided on the load carrying body, and further controlling the lifting and lowering sequence based on the measured pitch angular velocity when the load carrying body is pivotally mounted with respect to the pivot axis being substantially parallel to the pitch axis, or measuring a roll angular velocity of the load carrying body during the lifting and lowering sequence, by means of the sensing means provided on the load carrying body, and further controlling the lifting and lowering sequence based on the measured roll angular velocity when the load carrying body is pivotally mounted with respect to the pivot axis being substantially parallel to the roll axis.

12. A control unit for controlling a lifting and lowering sequence of a load carrying body of a vehicle, the control unit being configured to perform the steps of the method according to claim 1.

13. A vehicle comprising a chassis structure and a load carrying body pivotally mounted on the chassis structure with respect to a pivot axis being substantially parallel to either a pitch axis or a roll axis of the vehicle, the vehicle further comprising, sensing means provided on the chassis structure for measuring roll and pitch angle thereof and sensing means provided on the load carrying body for measuring roll and pitch angle thereof, and a control unit according to claim 12.

14. The vehicle according to claim 13, wherein the sensing means of the chassis structure and/or the load carrying body is any one of an inclination sensor, an accelerometer, or a gyroscope.

15. The vehicle according to claim 13, wherein the vehicle is an autonomous vehicle.

16. A non-transitory computer readable medium carrying a computer program comprising program code for performing the steps of claim 1, when said computer program is run on a computer.

* * * * *